J. B. West,
Lathe Dog.
No. 99,269.        Patented Jan. 25, 1870.
FIG. I.
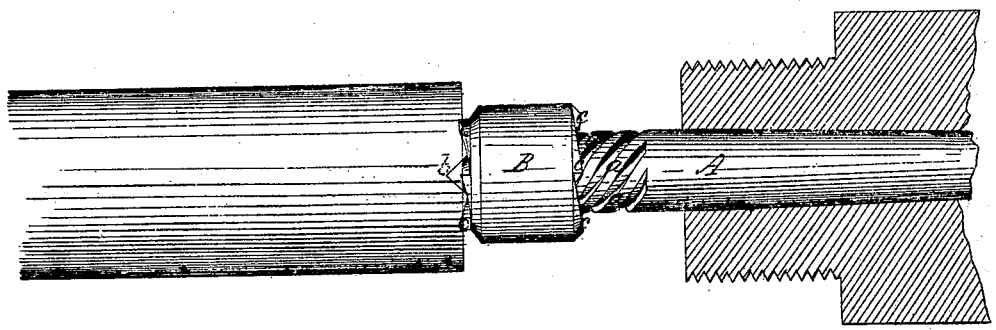
FIG. II.
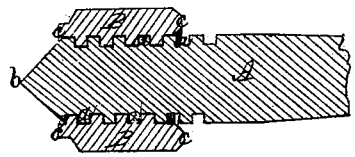
FIG. III.
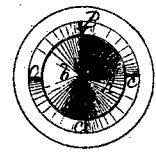
Witnesses.

United States Patent Office.

J. B. WEST, OF GENESEO, NEW YORK.

Letters Patent No. 99,269, dated January 25, 1870.

IMPROVED LATHE-DOG.

The Schedule referred to in these Letters Patent and making part of the same.

*To all whom it may concern:*

Be it known that I, J. B. WEST, of Geneseo, in the county of Livingston, and State of New York, have invented a certain new and useful Improvement in Lathe-Dogs; and I do hereby declare that the following is a full and exact description thereof, reference being had to the accompanying drawings, making part of this specification, in which—

Figure 1 represents a side elevation of my improvement, as connected with a bar of iron to be turned.

Figure 2, a section of the head of the dog.

Figure 3, an end view of the same.

Like letters of reference indicate corresponding parts in all the figures.

My invention consists in combining with the live-centre or shank of the lathe-spindle, a toothed chuck, receiving an end movement on a screw or equivalent, produced by the forward motion of the machinery, the action being such as to dog the article being turned by simply clamping to the end, thereby avoiding the cumbersome apparatus ordinarily used, and allowing the article to be turned entire, from end to end, at one operation, and without change.

In the drawings—

A indicates the ordinary live-centre or shank, which rests in the lathe-spindle, the form and construction being the same as that ordinarily used, except at the outer or bearing-end it is cut with a screw-thread or threads, *a*, or provided with some equivalent arrangement that will produce the adjustment of the chuck thereon, as will be presently described.

The point *b* of this centre bears on the bar or article to be turned in the usual manner.

On the end of this centre rests a chuck, B, of any desired size or form, turning freely back and forth on the screw-thread before described, or receiving end-movement in some equivalent manner.

One or both ends of this chuck are provided with a series of sharp teeth, *c c c*, which stand in the direction of motion of the machinery when in action. If the teeth are cut on both ends, their circles of diameter are preferably made of different sizes, so that by simply changing ends of the chuck, on the centre, they are adapted to the clamping of different-sized articles for turning.

The opposite, or dead-bearing of the lathe, is made in the usual way, to allow a free revolution of the article being turned.

In operation, the article to be acted upon is inserted in the lathe, and the chuck B turned up to contact with it on screw *a*. Then the forward motion of the machine will tighten it in place, causing the sharp-pointed teeth *c c* to bite into the end of the article, thereby causing it to revolve against the resistance of the cutting-tool. Thus it will be seen that the action is automatic, and the greater the resistance to the turning-action, the greater will be the clamping-power of the chuck. This arrangement is applicable to both metal and wood-lathes.

By this arrangement, it will be noticed that the dogging is produced at the end of the article, and not on the surface. Therefore, when the article is once fixed in the lathe, it may be turned or manipulated from one end to the other, over the whole surface, without any undogging or change.

This is a very great advantage, especially in those articles where it is difficult to adjust them a second time in perfect line, on changing ends.

In ordinary lathes, the dogging at the live-end is produced by a lever-clamp, having a socket that receives the end of the article to be turned, which is held in place by a set-screw, the lever being bent to connect with the face-plate of the lathe.

This is not only expensive and difficult to adjust, but, as it covers a portion of the surface of the article, the latter has to be undogged and its position reversed in the lathe, to complete the turning of the unfinished portion.

My arrangement is exceedingly cheap and simple, and occupies but little space; and, in these respects alone, it is far superior to the dogging-devices of other lathes.

What I claim as my invention, and desire to secure by Letters Patent, is—

The combination of the toothed chuck B with the live-centre A, when so arranged as to be self-clamping by the action of a screw-thread or threads, or other equivalent means, substantially as described.

In witness whereof, I have hereunto signed my name, in the presence of two subscribing witnesses.

J. B. WEST.

Witnesses:
   R. F. OSGOOD,
   GEO. W. MIATT.